April 12, 1927.
C. A. M. WEBER
1,624,378
ALTERNATING CURRENT MOTOR
Filed June 14, 1923
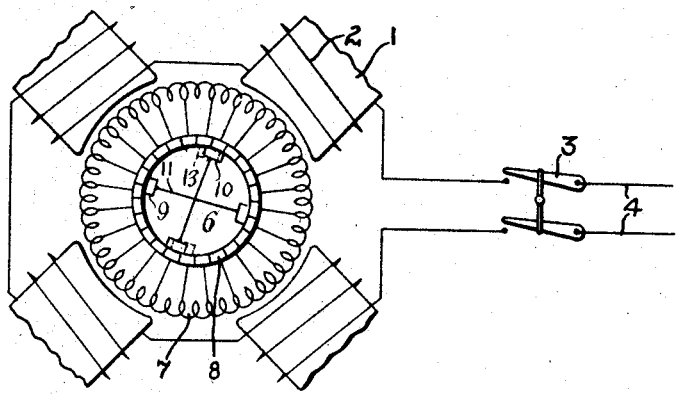
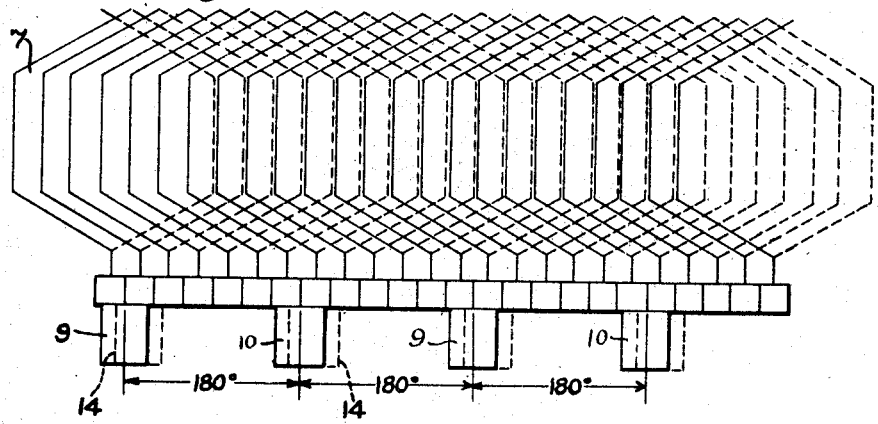
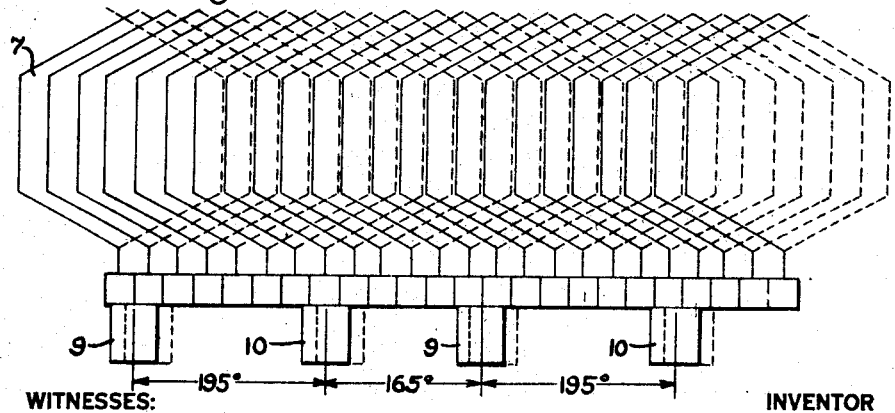
WITNESSES:
R. J. Butler.
S. M. Pineles
INVENTOR
Clifford A. M. Weber.
BY
Wesley G. Carr
ATTORNEY Patented Apr. 12, 1927.

1,624,378

UNITED STATES PATENT OFFICE.

CLIFFORD A. M. WEBER, OF SPRINGFIELD, MASSACHUSETTS, ASSIGNOR TO WESTINGHOUSE ELECTRIC & MANUFACTURING COMPANY, A CORPORATION OF PENNSYLVANIA.

ALTERNATING-CURRENT MOTOR.

Application filed June 14, 1923. Serial No. 645,238.

My invention relates to dynamo-electric machines of the commutator type and it has special reference to the arrangement of the brush members co-operating with the commutators of such machines.

One object of my invention is to provide a dynamo-electric machine of the commutator type having a novel relation between the spacing of the brushes and of the commutator bars in order to reduce the variation in the number of armature coils short-circuited by the brushes at different instants.

The reduction of the number, or duration of action, of armature coils short-circuited by the commutator brushes is of particular importance in alternating-current machines because of the damping action of the short-circuited coils by reason of their transformer relation to the alternating working flux of such machines.

A more specific object of my invention, therefore, is to provide an alternating-current motor of the commutator type having some of the brushes displaced from their normal positions by an amount corresponding to a fraction of the width of a commutator segment in order to reduce the variations in starting torque due to the portions of the winding which are short circuited by the brushes in passing from one segment to another during the starting operation of the motor.

A further object of my invention is to provide a single-phase motor of the commutator type having an improved starting characteristic.

The torque of alternating-current commutator motors varies from a minimum to a maximum value depending upon the number of coils of the winding short-circuited by the brushes in the various positions of the armature. This is of particular disadvantage during the starting period making it necessary to design the motors with special reference to the least favorable torque conditions.

I have found that by displacing some of the brushes by an amount equal to a fraction of the width of a commutator segment, instead of leaving all of the brushes in the normal positions which they would occupy when arranged in accordance with the electrical conditions prevailing in the machine, the number of coils short circuited by the commutator may be greatly reduced and a higher starting torque for a machine of the same size will be obtained, or the duration of the periods of minimum torque may be materially reduced.

My invention will be best understood by reference to the accompanying drawing, wherein—

Figure 1 is a diagrammatic view of an alternating-current motor of the repulsion type embodying my invention, and Figs. 2 and 3 are explanatory diagrams illustrating my invention and referred to hereinafter.

I will illustrate my invention in connection with a repulsion motor, although the invention is applicable as well to any other type of single-phase commutator or, in general, to any dynamo-electric machine wherein difficulties of a similar nature have to be overcome.

In Fig. 1 is shown a motor comprising a stator having four pole members 1 excited from a winding 2 which is connected, by means of a switch 3 to a single-phase supply line 4. The pole members 1 are shown for purposes of illustration as being of the salient pole type but, in an actual machine, the stator usually consists of a uniformly wound core giving the effect of distinct poles.

An armature 6 is arranged to rotate within the stator and comprises a winding 7 and a commutator 8, shown as having twenty-four bars, connected to the winding. Two pairs of brushes 9 and 10 are arranged to co-operate with the commutator 8, the opposite brushes of each pair being closed-circuited by means of a conductor 11, whereby the machine operates as a repulsion motor. The spacing between the brushes varies from the normal spacing of 180 electrical degrees, the brushes 10, which are of opposite polarity with respect to the brushes 9 being displaced from the normal positions indicated by the dotted lines 13 by an amount corresponding to half the width of a commutator bar.

The operation of a motor of the type just described depends upon the interaction of the flux through the pole members 1 and the current flowing through the armature 6 with the armature winding 7. The portion of the winding which is short circuited by the brushes when the corresponding commutator bars pass under the brush, is interlinked, in a transformer relation, with the main flux flowing through the machine. The alternations of the flux induce, in the short-circuited armature turns, a current which has a damping effect on the main alternating flux, so that the torque delivered by the motor is considerably diminished.

It is readily seen that the torque will be larger or smaller depending on the position of the brushes with respect to the rotating commutator, i. e. depending on the number of coils short-circuited by the brushes. The number of coils short-circuited by the brushes will in general vary from instant to instant, passing through a maximum and minimum during an angular movement of the rotor corresponding to one commutator bar. The maximum number of coil short circuits would occur when the number of commutator bars is a multiple of the number of brushes and when the brushes are spaced symmetrically upon the commutator.

The maximum number of coils short-circuited by the brushes could be reduced, as is well-known, by decreasing the number of brushes or by changing the number of bars so that they are not a multiple of the number of brushes. Such changes are sometimes not possible or desirable, for various reasons, and hence it becomes important to have some other method to reduce the harmful effects of the variation in the number of short-circuited coils.

According to my invention, the displacement of the brushes of one polarity from the normal position by an amount corresponding to one half of a commutator bar greatly reduces the fluctuation in the number of short circuits.

The effect of unsymmetrical spacing of the brushes will be understood by considering Figs. 2 and 3, each showing a developed view of the armature winding 1 and the commutator 8 connected to the winding. In Fig. 2, four brushes 9 and 10 are arranged symmetrically with respect to the field of the motor and spaced apart 180 electrical degrees. By counting the number of coils connected to the commutator bars which are short-circuited by the brushes, it will be found that four coils of the winding 7 are short circuited, or one coil per brush. After an angular movement corresponding to half a commutator bar, the brushes will occupy the positions shown by dotted lines 14 and short circuit eight coils of the winding 7 or two coils per brush. The number of coils short-circuited during the rotation of the commutator pulsates between four and eight.

In Fig. 3, the brushes 9 and 10 are shown arranged in accordance with my invention. The brushes 9 occupy their normal positions, brushes 10 are displaced by amounts corresponding to half a commutator bar, in this case 15 electrical degrees, the spacing between the brushes being 195 degrees, 165 degrees, 195 degrees and 165 degrees, respectively. In the positions illustrated by the full lines 9 and 10, the brushes short circuit six coils of winding 1, two coils being short circuited by the brush pair 9 and four coils by the other brush pair 10. After an angular movement of 15 electrical degrees, corresponding to one half of a commutator bar, the number of coils short circuited is also 6, the first brush pair 9 short circuiting four coils, while the second brush pair 10 now short-circuits two coils only.

The average number of short-circuited coils in the arrangement shown in Fig. 3 is the same as in the normal arrangement of the brushes which is shown in Fig. 2. The maximum variation in the number of short-circuited coils is, however, reduced by means of my invention and the starting torque conditions are thereby considerably increased.

The effect of shifting half of the brushes a distance corresponding to one-half of the width of a commutator bar is different, according to the brush width, but in every case the effect is beneficial. Thus, if the brush-width is 1¼ bar-widths, in a four-pole machine having a 24-bar commutator, with the even brush spacing shown in Fig. 2, eight coils are short-circuited one-quarter of the time and four coils are short-circuited three-quarters of the time; but with the uneven brush spacing shown in Fig. 3, only six coils are short-circuited one-half of the time and four coils are short-circuited the other half of the time.

If, however, the brush-width should be 1¾ bar-widths, with the even brush spacing shown in Fig. 2, eight coils would be short-circuited three-quarters of the time and four coils would be short-circuited one-quarter of the time; but with the uneven brush spacing shown in Fig. 3, eight coils would be short-circuited during only one-half of the time and six coils would be short-circuited the other half of the time.

It is the usual practice, in single-phase commutator motors, to utilize brushes which are only slightly wider than one commutator bar. A very few single-phase motors are being built with a brush-width greater than 1½ bars, but it is usually considered the better practice to utilize brushes of less width than 1½ bars, and a vast majority of the single-phase commutator motors now in use are so constructed.

As applied to most single-phase commutator motors, therefore, the application of my invention results in a reduction in the maximum number of armature coils which are short-circuited by the brushes at any instant, hence increasing the minimum starting torque. In other cases, while the maximum number of short-circuited coils is not reduced by my invention, the duration of this condition is materially reduced, and where the brush-width only slightly exceeds 1½ bars, the rotor positions of minimum starting torque are very restricted in extent. In every case, the difference between the maximum number of coils short-circuited and the minimum number of coils short-circuited at different positions of the rotor is reduced one-half by the application of my inventon.

The exact arrangement of the brushes which will be most desirable with the different types of dynamo-electric machines and different widths of the brushes may vary to a larger or lesser extent in accordance with the particular conditions but, by the application of the principles outlined above, such machines may be considerably improved, and I desire accordingly that my claims shall be interpreted as covering any modification or arrangement falling within the spirit and scope of my invention.

I claim as my invention:

1. A dynamo-electric machine comprising a member having a winding consisting of a plurality of coils, a commutator connected to said winding and a plurality of brush members co-operating with said commutator, the number of coils short-circuited by said brush members varying with the positions of the commutator during the rotation thereof, said brush members being spaced unevenly around the commutator, whereby the difference between the largest and the smallest number of coils short-circuited by said brush members at any moment during the rotation of said member is substantially a minimum.

2. A dynamo-electric machine comprising a commutator member and a plurality of brush members co-operating with said commutator member and movable relatively thereto, the number of commutator segments short-circuited by any one of said brush members varying with the positions of the commutator member during the rotation thereof, some of said brush members being displaced from the normal positions, as determined with respect to the electrical conditions prevailing in the machine, whereby a reduction is effected in the variations in the number of commutator segments covered by said brush members at any moment during the operation of said machine.

3. A dynamo-electric machine comprising a rotating member having a winding and a commutator member connected to said winding, a plurality of brush members co-operating with said commutator member, the number of commutator segments short-circuited by any one of said brush members varying with the positions of the commutator during the rotation thereof, the relative spacing of brush members of opposite polarity varying slightly from the normal spacing of 180 electrical degrees so as to reduce the variations in the numbers of coils of said winding close-circuited by said brush members during the operation of said machine.

4. An alternating-current dynamo-electric machine comprising a rotating member having a winding, a commutator member connected to said winding and a plurality of brush members co-operating with said commutator member and short-circuiting portions of said winding, the brush members of one polarity being displaced from their normal positions, as determined by the electrical conditions of said machine, by an amount corresponding to a fraction of a commutator bar.

5. A dynamo-electric machine comprising a stator member and a rotor member adapted to be supplied from a single-phase alternating-current system, a winding upon said rotor member, a commutator connected to said winding and a plurality of brush members co-operating with said commutator and short-circuiting portions of said winding, the spacing between said brush members being changed, as against the normal spacing determined by the electrical conditions of said machine, by an amount corresponding to a fraction of a commutator bar.

6. A single-phase alternating-current motor comprising a stator member, a rotor member co-operating therewith, a commutator member connected to said winding and a plurality of brush members bearing upon said commutator member and short-circuiting portions of said winding whenever a brush member is in contact with more than one commutator bar, the spacing between brush members of opposite polarity being changed as against the spacing determined by the electrical conditions of said machine by an amount corresponding to half the width of a commutator bar.

7. A single-phase alternating-current motor comprising a stator member having a plurality of poles, a rotor member co-operating therewith, a commutator member having a plurality of commutator bars connected to said winding, the number of commutating bars of said commutator members being an integral multiple of the number of said poles, and a plurality of brush members co-operating with said commutator member and short circuiting a portion of said winding whenever a brush member is in contact with more than one commutator bar, the spacing between brush members of opposite polarity being changed from the normal spacing of 180 electrical degrees by an amount equal to a fraction of a commutator bar.

8. An alternating-current dynamo-electric machine comprising a stator member, a rotor member having an armature winding and a commutator associated therewith and at least one pair of brushes of opposite polarity co-operating with said commutator, the number of commutator bars being divisible by the number of brushes, and one of the brushes being displaced by substantially half the width of one commutator bar from its normal 180° relation to the other brush.

9. A single-phase dynamo-electric machine comprising a stator member, a rotor member having an armature winding and a commutator associated therewith, and a plurality of brushes co-operating with said commutator, the number of commutator bars being a multiple of the number of brushes, and all of the brushes of one polarity being displaced by substantially half the width of one commutator bar from its normal 180° relation to the other brush or brushes.

In testimony whereof, I have hereunto subscribed my name this 28th day of May, 1923.

CLIFFORD A. M. WEBER.